(12) United States Patent
Ji et al.

(10) Patent No.: US 10,044,668 B2
(45) Date of Patent: Aug. 7, 2018

(54) EXPANDING A SOCIAL NETWORK

(71) Applicant: Microsoft Technology Licensing, LLC, Redmond, WA (US)

(72) Inventors: Haifeng Ji, San Jose, CA (US); Myunghwan Kim, San Jose, CA (US); Shruti Bhosale, Santa Clara, CA (US); Brad Christopher Ciraulo, Redwood City, CA (US); Andrew P. Hill, San Francisco, CA (US); Mitul Tiwari, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 306 days.

(21) Appl. No.: 14/968,477

(22) Filed: Dec. 14, 2015

(65) Prior Publication Data

US 2017/0155615 A1 Jun. 1, 2017

Related U.S. Application Data

(60) Provisional application No. 62/261,146, filed on Nov. 30, 2015.

(51) Int. Cl.
*G06F 15/16* (2006.01)
*H04L 12/58* (2006.01)
*H04L 29/08* (2006.01)

(52) U.S. Cl.
CPC .............. *H04L 51/32* (2013.01); *H04L 51/12* (2013.01); *H04L 51/36* (2013.01); *H04L 67/306* (2013.01)

(58) Field of Classification Search
CPC .......... H04L 51/32; H04L 51/12; H04L 51/36; H04L 67/306
USPC ........................................................ 709/219
See application file for complete search history.

(56) References Cited

U.S. PATENT DOCUMENTS

| 9,571,605 B1* | 2/2017 | Givoly | H04L 67/306 |
|---|---|---|---|
| 2012/0041939 A1* | 2/2012 | Amsterdamski | G06F 17/30867 |
| | | | 707/709 |
| 2013/0086008 A1* | 4/2013 | Souza | G06Q 10/10 |
| | | | 707/692 |
| 2016/0080485 A1* | 3/2016 | Hamedi | H04L 67/02 |
| | | | 709/204 |

* cited by examiner

*Primary Examiner* — Sm Rahman
(74) *Attorney, Agent, or Firm* — Schwegman Lundberg & Woessner, P.A.

(57) ABSTRACT

This disclosure relates to systems and methods for expanding a social network. A method includes retrieving contact lists from a plurality of devices, generating a list of associations between identifiers in a first communication channel and identifiers in a second communication channel, removing, from the list of associations, one or more associations that include identifiers that do not represent contacts that are not members of the online social networking service, and transmitting an invitation to join the online social networking service to the second identifiers on the second communication channel for associations that remain in the list of associations.

12 Claims, 12 Drawing Sheets

EXPANDING A SOCIAL NETWORK

RELATED APPLICATIONS

This application claims the priority benefit of U.S. Provisional Application No. 62/261,146, entitled "EXPANDING A SOCIAL NETWORK," filed Nov. 30, 2015 which is hereby incorporated herein by reference in its entirety.

TECHNICAL FIELD

The subject matter disclosed herein generally relates to expanding a social network and, more particularly, to migrating a social graph in one communication channel to another communication channel.

BACKGROUND

As technology advances, people across the world are becoming connected in a wide variety of different communication channels. In certain examples, people are connected via an online social networking service using emails as an identifier for the individual members.

However, according to technology, trends, or other factors, people may migrate to other communication channels. Examples include, mobile telephone numbers, network handles or other unique identifiers representing people. A social network that tracks members according to a previous communication channel may lose contact with members as they migrate to other channels.

BRIEF DESCRIPTION OF THE DRAWINGS

Some embodiments are illustrated by way of example and not limitation in the figures of the accompanying drawings.

DETAILED DESCRIPTION

Figure 1:
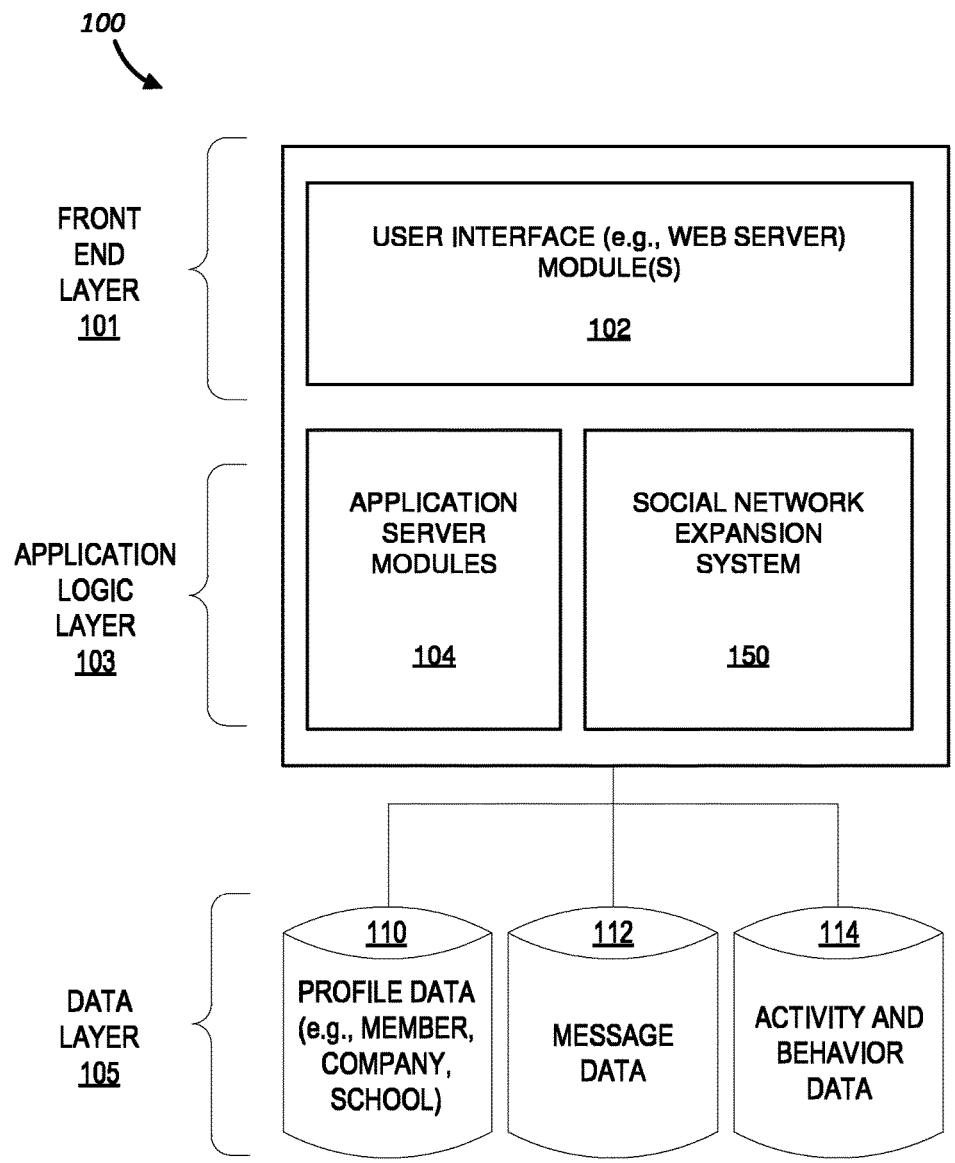
FIG. 1 is a block diagram illustrating various components or functional modules of an online social networking service, in an example embodiment.

The description that follows includes systems, methods, techniques, instruction sequences, and computing machine program products that embody illustrative embodiments of the invention described in the present disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Example methods and systems are directed to expanding a social network. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Techniques for expanding an online social network have been developed that provide for retrieving contact lists from members of the online social networking service, generating a list of associations between a first type of identifier and a second type of identifier, filtering the list to remove associations that include identifiers that do not represent non-members of the online social networking service, and inviting those contacts remaining in the list. In one specific example, the first type of identifier is an email and the second type of identifier is a mobile telephone number.

The system facilitates generation of a social networking graph in a new communication channel based on associations between an already existing social networking graph and social connections in the new communication channel. In one specific example, the system facilitates generation of a social networking graph based on mobile telephone numbers using an already existing social networking graph of email addresses.

By strategically removing associations that represent members of the online social networking service, junk associations, or other associations that do not represent non-members of the online social networking service, the system may then transmit invitations to identifiers that are more likely non-members of the online social networking service. In this way, the system more efficiently invites non-members of the online social networking service to join. Furthermore, the system is much less likely to invite someone that is already a member of the online social networking service, or transmit an invite to an identifier that does not represent a potential member.

One of the technical benefits to this approach is that the system does not invite persons who are already members of the online social networking service which may irritate members. Another benefit is that invitations are not wasted by transmitting invitations to identifiers that do not represent potential contacts that may become members of the online social networking service. This also avoids or reduces a cost associated with transmitting the invitations.

FIG. 1 is a block diagram illustrating various components or functional modules of an online social networking service 100, in an example embodiment. The online social networking service 100 may be utilized to expand the online social networking service 100. In one example, the online social networking service 100 includes the social network expansion system 150 that performs the various expansion operations described herein.

A front end layer 101 consists of one or more user interface modules (e.g., a web server) 102, which receive requests from various client-computing devices and communicate appropriate responses to the requesting client devices. For example, the user interface module(s) 102 may receive requests in the form of Hypertext Transport Protocol (HTTP) requests, or other web-based, application programming interface (API) requests. In another example, the front end layer 101 receives requests from an application executing via a member's mobile computing device. In one example, a member submits media content to be transmitted to other members of the online social networking service 100.

An application logic layer 103 includes various application server modules 104, which, in conjunction with the user interface module(s) 102, may generate various user interfaces (e.g., web pages, applications, etc.) with data retrieved from various data sources in a data layer 105.

In some examples, individual application server modules 104 may be used to implement the functionality associated with various services and features of the online social networking service 100. For instance, the ability of an organization to establish a presence in the social graph of the online social networking service 100, including the ability to establish a customized web page on behalf of an organization, and to publish messages or status updates on behalf of an organization, may be services implemented in independent application server modules 104. Similarly, a variety of other applications or services that are made available to members of the online social networking service 100 may be embodied in their own application server modules 104. Alternatively, various applications may be embodied in a single application server module 104.

In some examples, the online social networking service 100 includes the social network expansion system 150, which may retrieve contact lists, generate associations, filter the associations to remove associations that include contacts that are not non-members, and invite contacts that remain in the list of associations.

As illustrated, the data layer 105 includes, but is not necessarily limited to, several databases 110, 112, 114, such as a database 110 for storing profile data, including both member profile data as well as profile data for various organizations. In certain examples, the profile data includes the properties and/or characteristics of members of the online social networking service 100. Consistent with some examples, when a person initially registers to become a member of the online social networking service 100, the person may be prompted to provide some personal information, such as his or her name, age (e.g., birthdate), gender, sexual orientation, interests, hobbies, contact information, home town, address, the names of the member's spouse and/or family members, educational background (e.g., schools, majors, matriculation and/or graduation dates, etc.), occupation, employment history, skills, religion, professional organizations, and other properties and/or characteristics of the member. This information is stored, for example, in the database 110. Similarly, when a representative of an organization initially registers the organization with the online social networking service 100, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

The online social networking service 100 may provide a broad range of other applications and services that allow members the opportunity to share and receive information, often customized to the interests of the member. For example, with some examples, the online social networking service 100 may include a message sharing application that allows members to upload and share messages with other members. With some examples, members may be able to self-organize into groups, or interest groups, organized around a subject matter or topic of interest. With some examples, the online social networking service 100 may host various job listings providing details of job openings within various organizations.

As members interact with the various applications, services, and content made available via the online social networking service 100, information concerning content items interacted with, such as by viewing, playing, and the like, may be monitored, and information concerning the interaction may be stored, for example, as indicated in FIG. 1 by the database 114. In one example embodiment, the interactions are in response to receiving a message requesting the interaction.

Although not shown, with some examples, the online social networking service 100 provides an application programming interface (API) module via which third-party applications can access various services and data provided by the online social networking service 100. For example, using an API, a third-party application may provide a user interface and logic that enables the member to submit and/or configure a set of rules used by the social network expansion system 150. Such third-party applications may be browser-based applications, or may be operating system specific. In particular, some third-party applications may reside and execute on one or more mobile devices (e.g., phone, or tablet computing devices) having a mobile operating system.

Figure 2:
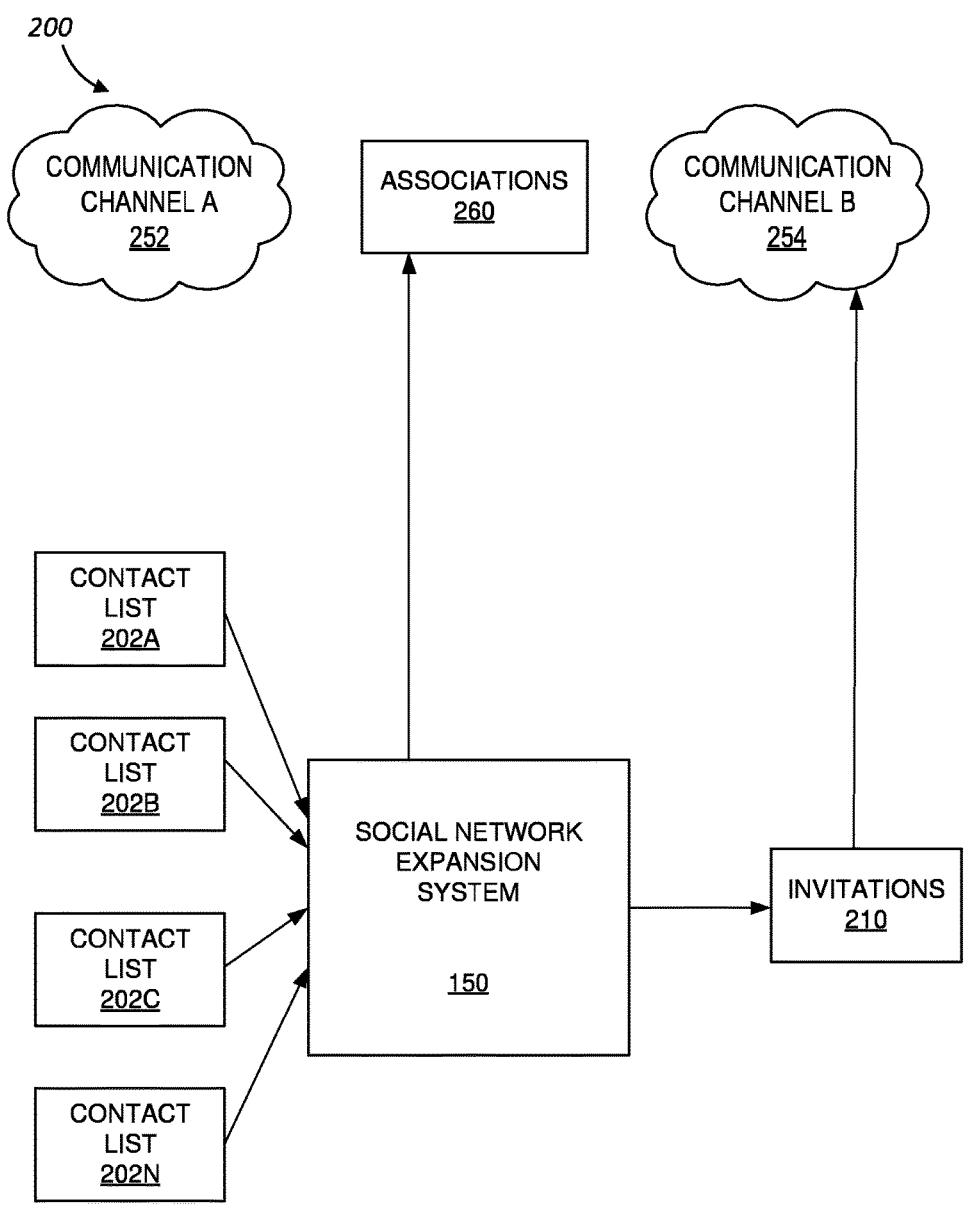
FIG. 2 is a block diagram illustrating one example scenario that includes a social network expansion system according to one example embodiment.

FIG. 2 is a block diagram illustrating one example scenario 200 that includes a social network expansion system 150 according to one example embodiment. In one example embodiment, the social network expansion system 150 retrieves contact lists from a plurality of members of an online social networking service 100. In one example, the social network expansion system 150 retrieves a first contact list 202A from a first member, a second contact list 202B from a second member, a third contact list 202C, and more contact lists up to contact list 202N. Of course, the Nth contact list does not necessarily represent the 14$^{th}$ contact list and may represent any number of contact lists. In one example, the Nth contact list is the 100$^{th}$ contact list. In another example, the Nth contact list is the 10,000$^{th}$ contact list. Therefore, this disclosure is not limited regarding the number of contact lists retrieved by the social network expansion system 150. In one example embodiment, the social network expansion system 150 migrates a social graph of members on a communication channel 252 to another communication channel 254 by performing the various operations described herein. In one example, the social network expansion system 150 generates a social graph at mobile telephone communication channel that is similar to the social graph at an email communication channel.

In one example embodiment, the social network expansion system 150 generates a list of associations 260 between identifiers in a first communication channel and identifiers in a second communication channel by matching identifiers in the contact lists. In one example, the associations include a first identifier of a first type and a second identifier of a second type. In one example, a first type is an email address and a second type is a mobile telephone number. In this example, each association includes an email address and a mobile telephone number. In this way, the associations represent unique identifiers for a person across several different communication channels. In one example, an entry in contact list 202A includes: Jim White, jim.white@domain.com, 123-456-7890.

In response to the first identifier type being an email address and a second identifier type being a mobile telephone number, the social network expansion system 150 generates an association that includes (jim.white@domain.corn, 123-456-7890). The system continues making associations between a first identifier type and a second identifier type using all of the contacts in the contact lists 202. Of course, many of the associations 260 include members of the online social networking service 100, non-members of the online social networking service 100, invalid identifiers, and the like. As described herein, an "invalid" identifier is an identifier that represents a non-person. In certain examples, an invalid identifier includes corporate phone numbers, support identifiers such as emails, phone numbers, support handles, or the like, identifiers with entities other than persons, etc.

The social network expansion system 150 removes contacts from the list of associations 260 based on a determination that the respective contacts are not non-members of the online social networking service 100. In one example, the social network expansion system 150 removes an association from the list in response to determining that the association includes an identifier for a person that is already a member of the online social networking service 100 based, at least in part, on the first identifier matching an identifier for the member at the online social networking service 100. For example, the first identifier is an email address and the social network expansion system 150 matches the email address with the member.

In another example embodiment, the social network expansion system 150 removes an association from the list 260 in response to determining that the first identifier is an invalid identifier. In one example, the second identifier is for a commercial entity, such as, but not limited to, a pharmacy, a restaurant, a support number, a help-line, or other entity that does not represent a person.

In another example, the social network expansion system 150 removes an association from the list 260 in response to determining that a portion of either the first or the second identifier includes a predefined string of characters. In one example, the second identifier is a telephone number, and the string of characters includes a prefix of "900." As one skilled in the art may appreciate, a regular expression may be configured to determine whether an identifier includes a predefined prefix, or other sequences of characters in certain locations. In another example embodiment, the predefined sequence of characters includes the sequence "support." In response to the social network expansion system 150 determining that an identifier includes the sequence "support," the social network expansion system 150 removes the association from the list.

After removing associations from the list 260 that do not represent non-members of the online social networking service 100, the social network expansion system 150 invites remaining contacts by transmitting invitations 210 to the second identifier using a second communication channel. In one example, the second identifier is a mobile telephone number and the second communication channel is a mobile communication network. In another example, the second identifier is a username or handle and the second communication channel is a server that manages communications for a remote social network, or other system having many users.

In this way, the social network expansion system 150 uses associations 260 to migrate a social graph based on one communication channel to corresponding connections on a second communication channel. For example, the social network expansion system 150 may employ existing email address records to generate a similar social graph using mobile telephone numbers. The social network expansion system 150 may similarly migrate social connections to other social networks implemented on a different communication channel. In another example, the second communication channel is a different social networking service and the identifiers are handles or usernames for the different social networking service.

Figure 3:
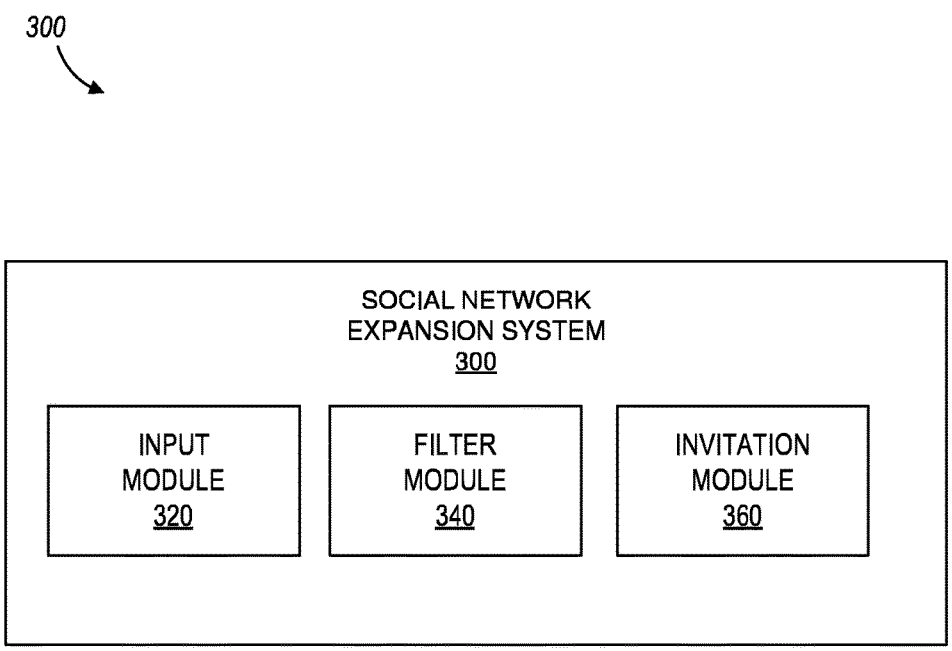
FIG. 3 is another block diagram illustrating components of a social network expansion system, according to one example embodiment.

FIG. 3 is another block diagram 300 illustrating a social network expansion system 150 according to one example embodiment. In one example embodiment, the social network expansion system 300 includes an input module 320, a filter module 340, and an invitation module 360.

In one example embodiment, the input module 320 is configured to retrieve one or more contact lists from a plurality of members of the online social networking service 100. In one example, the input module 320 sends a request to an application executing on a mobile device for a member. In response, the application transmits the contact list from the mobile device to the input module 320.

In another example embodiment, the input module 320 receives a file that includes many contacts. The file may be formatted according to a contact file specification, or be in any other format. In one example, a contact file specification is a Windows™ Address Book, but of course, other formats may be used and this disclosure is not limited in this regard. In another example embodiment, the input module 320 retrieves a contact list from a member's profile. The member's profile may be stored in the database 110, but of course, this is not necessarily the case. Of course, one skilled in the art may recognize many other ways in which the input module 320 could retrieve or receive a list of contacts and this disclosure is not limited in this regard.

In one example embodiment, the input module 320 retrieves the list of contacts in response to a member requesting that his/her contacts be invited to the online social networking service 100. In response, the input module 320 retrieves the list of contacts from the member's profile, computing device, or any other indicated resource as one skilled in the art may appreciate.

Each entry in the list of contacts may include a wide variety of different identifiers, and may include identifiers for many different communication channels. Examples of identifiers for various communication channels include, but are not limited to, email addresses, telephone numbers, profile handles, usernames, numerical values, or any other unique identifiers as one skilled in the art may appreciate. In certain examples, the unique identifiers include handles for Twitter™, Instagram™, WeChat™, or other social network services, or the like. In one specific example, contacts in a contact list include email addresses and mobile telephone numbers.

In one example embodiment, the filter module 340 generates a list of associations between a first identifier for a first communication channel and a second identifier for a second communication channel. In one example, the first communication channel and the second communication channel are configured by an administrator of the social network expansion system 150. For example, an administrator may indicate email as a first communication channel, and mobile telephone as a second communication channel. In response, the filter module 340 generates a list of associations between email and telephone numbers by matching first identifiers in two or more contacts and association other identifiers in the contacts with the first identifiers as described herein In another example embodiment, the filter module 340 removes contacts from the list of associations based on a determination that the respective contacts are not non-members of the online social networking service 100. In one example embodiment, the filter module 340 removes contacts from the list of associations in response to determining that the contacts are members of the online social networking service 100. For example, the filter module 340 may compare indicators with indicators in the database 110. In response to the indicators in the contact list matching indicators in the profile data database 110, the filter module 340 determines that the contact is a member of the online social networking service 100, and removes the contact from the list of associations.

In one example embodiment, the filter module 340 removes an association from the list of association in response to an identifier in the association at least partially matching a predetermined sequence of characters. In one example, a predetermined sequence of characters is "888." In response to a telephone number in an association beginning with "888," the filter module 340 removes the association from the list of associations.

In one example embodiment, the filter module 340 employs a regular expression to determine whether an identifier includes a predetermined sequence of characters. As known in the art, a regular expression is a sequence of characters that define a pattern and is used to perform pattern matching, string matching, or the like. As one skilled in the art may appreciate, a regular expression may be used to determine whether an identifier includes a sequence of characters, begins with a sequence of characters, ends with a sequence of characters, or conforms to any other pattern of characters. Certain examples include, but are not limited to, beginning with an "800," including "pharmacy," including "support," or including any other sequence of characters that indicates that the association does not represent a potential members of the online social networking service 100.

In one example embodiment, the filter module 340 receives a list of telephone number prefixes that indicate that the telephone number is a land line, and not specifically associated with a person. In one example embodiment, telephone numbers in a specific jurisdiction includes prefixes to indicate whether a telephone number is a land-line or a mobile telephone number. In this example, the filter module 340 determines that a telephone number is a land-line, and removes the association in response to the association including an indicator that includes the telephone number because a land-line may not represent a specific human person. In another example embodiment, the filter module 340 communicates with a remote service, remote database, or other data repository to determine whether a telephone number represents a specific person or not. In this example, the filter module 340, using a regular expression, determines whether any of the contacts represented by identifiers in the list of associations begin with one of the land line prefixes, and remove the matching associations from the list of associations.

In another example embodiment, the filter module 340 in response to determining that a contact in the list of associations is a member of the online social networking service 100, updates a profile for the member with either of the indicators in the association that are not included in the profile for the member. In this way, the filter module 340 increases completeness of member profiles in the profile data database 110.

In another example embodiment, the filter module 340 removes an association in the list of associations in response to a threshold number of contact lists including the contact in the association. For example, in response to 50 different contact lists including a contact, the filter module 340 removes the contact from the list of associations. In this way, the filter module 340 removes associations that include identifiers that indicate corporate numbers, support numbers, or other commonly contacted entities that do not likely represent a person or non-member of the online social networking service 100.

In other embodiments, the filter module 340 removes an association from the list of association in response to the association including an invalid identifier. In one example an invalid identifier is an identifier that does not represent a human or potential member of the online social network service 100. In one example, an invalid identifier in an association includes a blacklisted identifier, a suspicious identifier, an erroneous identifier, an illegible identifier, an identifier that matches a word in a language dictionary, or the like. Invalid identifiers that do not represent non-members of the online social networking service may also include identifiers that do not conform to a recognizable pattern. In one example, a recognizable pattern is 10 digits for a telephone number. In response to a telephone number having 11 digits, the filter module 340 determines that the telephone number is not a non-member of the online social networking service because the 11 digits do not conform to the recognizable pattern of 10 digits. In another example, a recognizable pattern for an email includes an '@' sign. In response to an email not having an '@' sign, the filter module 340 removes the association from the list of associations because the identifier is invalid.

In other examples, invalid identifiers include unrecognized area codes (e.g., area codes that are not found in a database of recognized area codes), unrecognized country codes, unrecognized zip codes, telephone number with an incorrect number of characters, or identifiers with other technical deficiencies.

In one example embodiment, the filter module 340 removes a contact from the list of associations in response to the filter module 340 not being sure about the status of the contact. In one example, a contact identifier includes the name "Bob Smith." Although there may be a member of the online social networking service 100 having a name of "Bob Smith," the filter module 340 may not be able to determine whether the "Bob Smith" in the list of associations is the same person as the "Bob Smith" in the profile data database 110. In response, the filter module 340 removes the association in the list of associations. In this way, the social network expansion system 150 is less likely to invite a member of the online social networking service 100.

In another example embodiment, the filter module 340 removes a contact from the list of associations in response to a contact in one of the associations not desiring to be a member of the online social networking service 100. In one example, the contact has unsubscribed from messages from the online social networking service 100. In another example embodiment, the contact has identified messages from the online social networking service 100 as spam. Therefore, based, at least in part, on an indicator received from the contact, the filter module 340 determines that the contact does not desire to be a member of the online social networking service 100 and removes the contact from the list of associations. Of course, one skilled in the art may recognize other ways in which a contact indicates a preference to not be connected with the online social networking service 100 and this disclosure is not limited in this regard.

In one example embodiment, the invitation module 360 is configured to invite remaining contacts in the list of associations by transmitting an invite to the second identifier on the second communication channel. In one example, the second identifier is a handle at a remote social networking system, and the invitation module 360 transmits a message to the second identifier at the remote social networking system. In another example, the second identifier is a mobile telephone number and the invitation module 360 transmits an SMS text message to the mobile telephone number to invite the person using the mobile telephone number to join the online social networking service 100.

In another example embodiment, the invitation module 360 presents an option to a member to invite contacts in the contact list for the member. In response, the social network expansion system 150 processes the members list of contacts as described herein.

In one example embodiment, the invitation module 360 transmits the invitations in response to a command from a user. In one example, the input module 320 retrieves a list of contacts from a user's mobile computing device and the invitation module 360 transmits the invitations to the contacts after receiving an indication from the user to do so. In this way, the user has greater influence over whether his/her contacts receive an invitation to join the online social networking service 100. In another example, the invitation module 360 receives an indicator from the user to not transmit the invitations to the contacts in the list of associations and the invitation module 360 removes contacts from that user's computing device.

Figure 4:
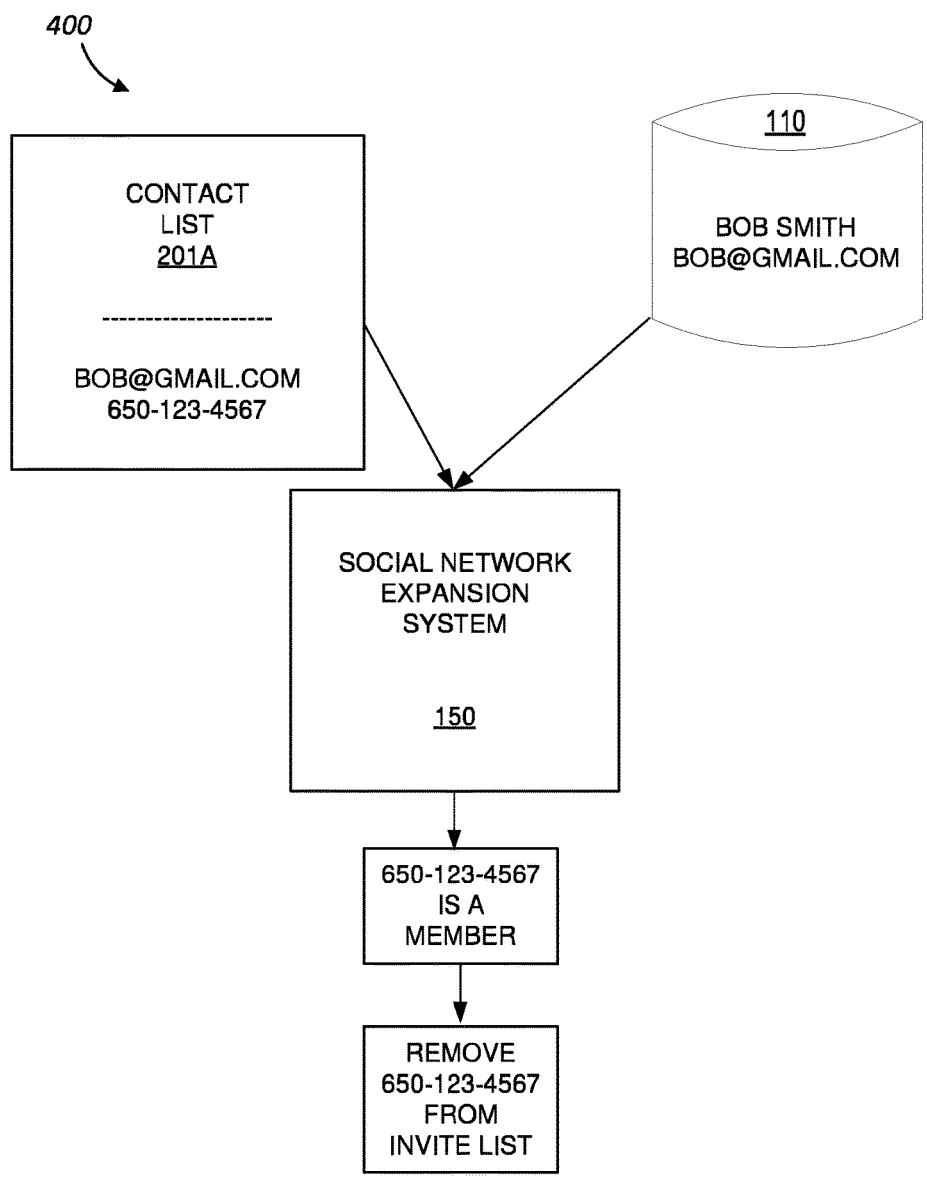
FIG. 4 is a schematic block diagram illustrating another example scenario that includes a social network expansion system, according to one example embodiment.

FIG. 4 is a schematic block diagram illustrating another example scenario 400 that includes a social network expansion system, according to one example embodiment. In one example embodiment, the input module 320 retrieves a first contact list 201A that includes a contact with an email address of "BOB@GMAIL.COM," and a telephone number of 650-123-4567. The input module 320 also retrieves a member record from the profile data database 110 that includes the same email "BOB@GMAIL.COM."

In this example embodiment, the filter module 340 generates an association that includes ("BOB@GMAIL.COM," 650-123-4567). In one example, the filter module 340 determines that the telephone number for the contact represents a member of the online social networking service 100 based on the associated email address being included in a list of members. Because an email address is a unique identifier, the filter module 340 makes this determination with certainty. In response, the filter module 340 removes the association from a list of generated associations because the association does not include an identifier that represents a non-member of the online social networking service 100. In one example embodiment, the association is a record in a database that includes the first identifier for the first communication channel, and the second identifier for the second communication channel.

Figure 5:
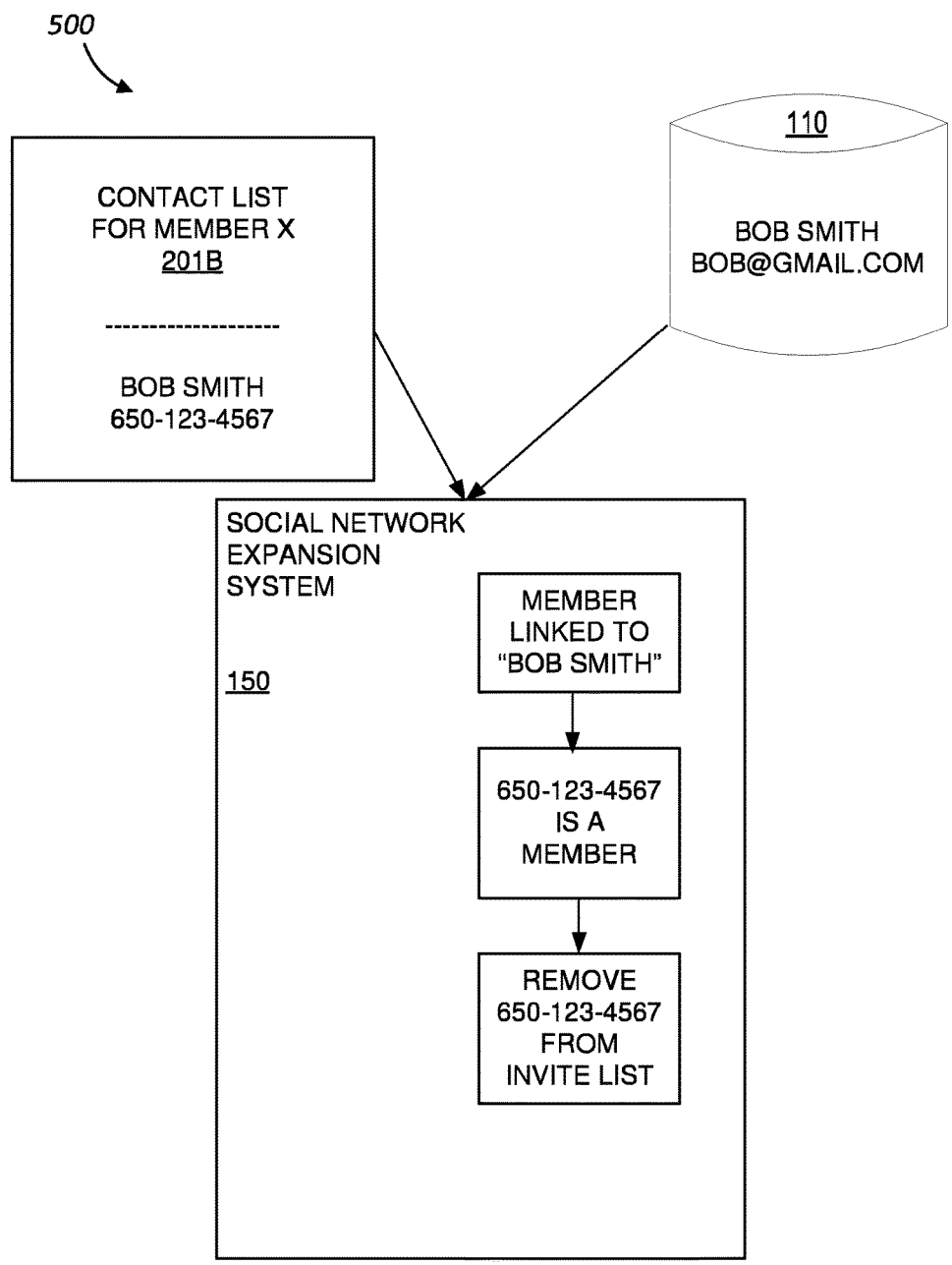
FIG. 5 is a schematic block diagram illustrating another example scenario for a social network expansion system, according to an example embodiment.

FIG. 5 is a schematic block diagram illustrating another example scenario 500 for a social network expansion system 150, according to an example embodiment. In this example embodiment, the input module 320 retrieves a contact list 201B from a member of the online social networking service 100. In this example, the contact list includes a contact record that includes a name and a telephone number, ("BOB SMITH," "650-123-4567"). In response, the filter module 340 includes the association in a list of associations as described herein.

In response to the member being linked to another member at the online social networking service 100 with a name of "BOB SMITH," the filter module 340 determines that the number 650-123-4567 is for a member of the online social networking service 100 and the filter module 340 removes the association from the list of contacts that will be invited to join the online social networking service 100.

In another example embodiment, the "BOB SMITH" has indicated a desire to not be connected with the online social networking service 100 by requesting to not receive messages from the online social networking service 100. In response, the filter module 340 removes the association that includes "BOB SMITH" from the list of associations.

Figure 6:
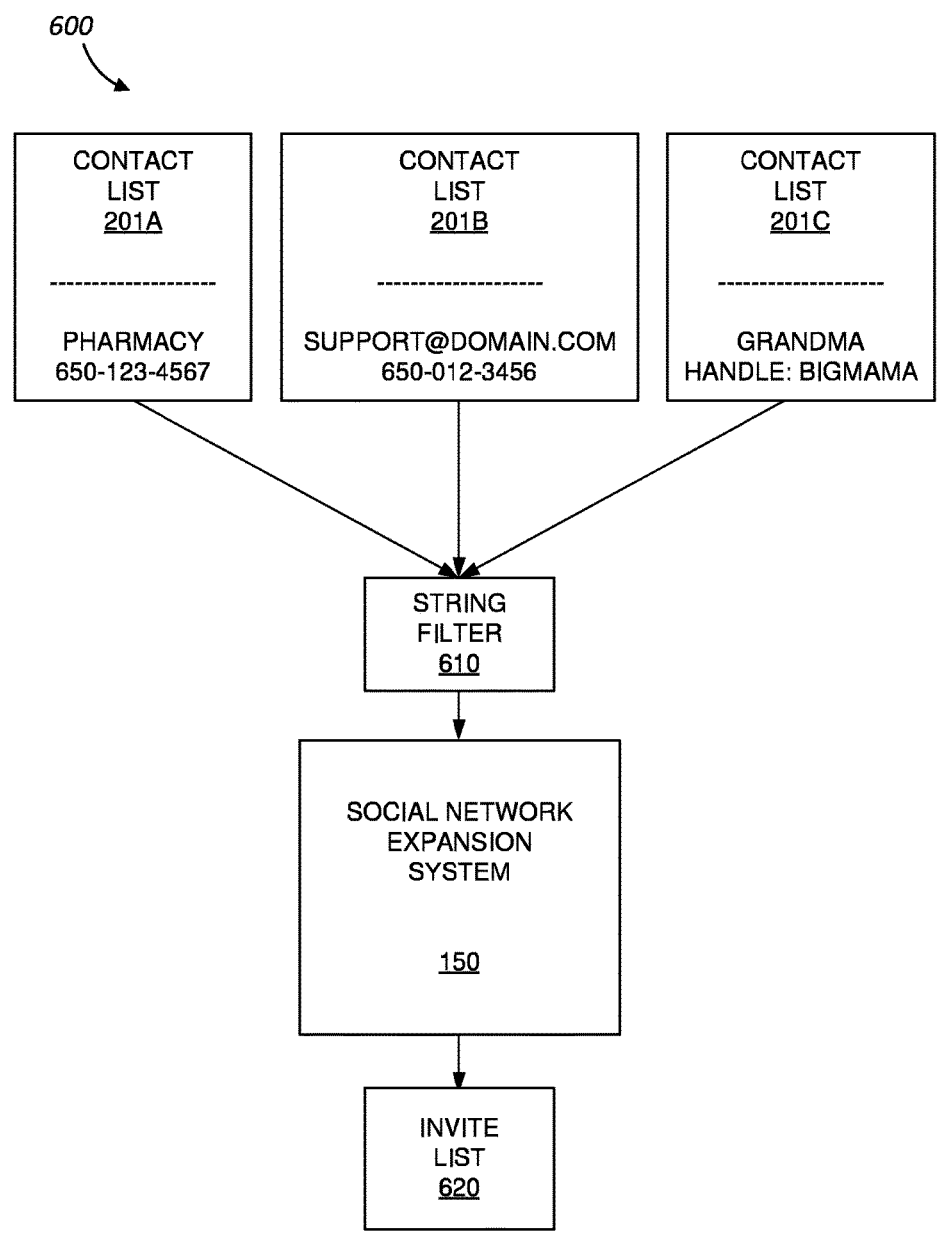
FIG. 6 is a schematic block diagram illustrating one example scenario for expanding a social network, according to an example embodiment.

FIG. 6 is a schematic block diagram illustrating one example scenario 600 for expanding a social network, according to an example embodiment. In an example embodiment, the scenario 600 includes a string filter 610 and the social network expansion system 150. In one example embodiment, the string filter 610 is configured to identify identifiers that do not represent non-members of the online social networking service 100. The social network expansion system 150, in this example, generates a list of contacts to invite to join the online social networking service 100.

In one example embodiment, the input module 320 retrieves a first contact list 201A, a second contact list 201B, and a third contact list 201C. According to the scenario 600 depicted in FIG. 6, the first contact list 201A includes a contact record indicating an association between "Pharmacy" and 650-123-4567, the second contact list 201B includes a contact record indicating an association between "support@domain.com" and 650-012-3456, and the third contact list 201C includes a record that indicates an association between "GRANDMA," AND "BIGMAMA." The filter module 340 generates a list of associations based on the records in the contact lists 201.

In one example embodiment, the filter module 340 applies the string filter 610 using a regular expression to determine whether any of the associations in the list of associations includes a predefined sequence of characters. In this example, predefined sequences of characters include "pharmacy," "support," and "grandma." Of course, an administrator for the social network expansion system 150 may configure the string filter 610 according to other sequences of characters and this disclosure is not limited in this regard. In one example, the administrator arranges a regular expression to identify and filter identifiers that include certain sequences of characters and the filter module 340 removes associations from the list according to the regular expression. Furthermore, the regular expression may be configured to disregard character case. Therefore, "Pharmacy" may match "PHARMACY," pharmacy," "PhArMaCY," or other case variations.

In another example embodiment, the filter module 340 removes associations from the list of associations where the associations include identifiers that are for contacts that are not non-members of the online social networking service 100 or have indicated a desire to not be connected with the online social networking service 100. In this way, the filter module 340 culls the list of associations to those contacts that are potential members who have not yet been invited to join the online social networking service 100. In one example, the filter module 340 removes an association by deleting the record for the association in a database.

In one example embodiment, the filter module 340 removes the association that includes the predetermined sequence of characters "Pharmacy." In another example embodiment, the filter module 340 removes the association that includes the predetermined sequence of characters "support." In one example embodiment, the filter module 340 removes the association that includes the predetermined sequence of characters "grandma." In another example embodiment, the invitation module 360 invites contacts that remain in the list of associations as described herein. In another example embodiment, the filter module 340 removes associations by flagging the associations in a database of associations. In this example, the invitation module 360 does not transmit invitation to second identifiers that are flagged in the database of associations.

Figure 7:
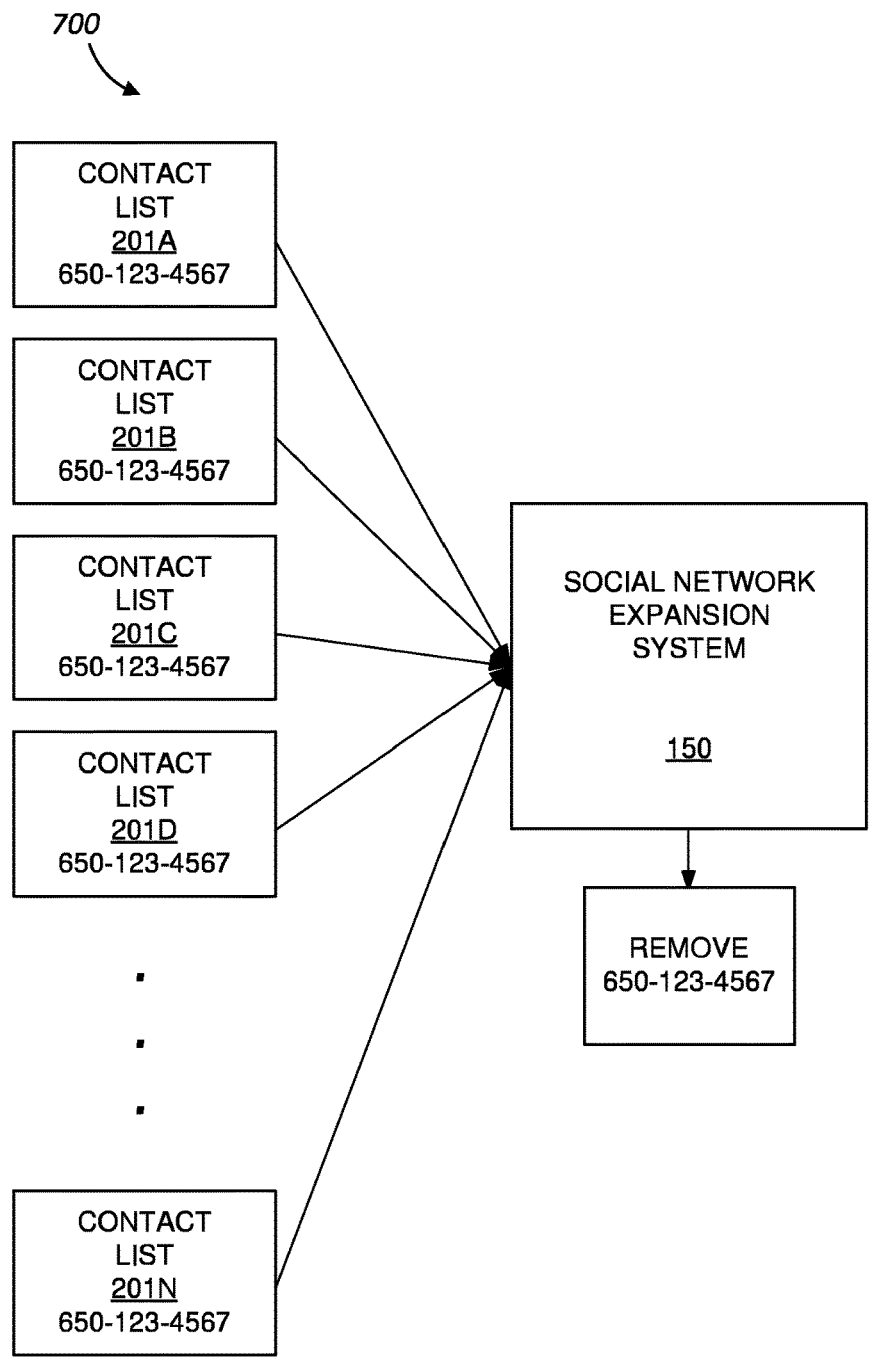
FIG. 7 is a schematic block diagram illustrating another example scenario for expanding a social network, according to an example embodiment.

FIG. 7 is a schematic block diagram illustrating another example scenario 700 for expanding a social network, according to an example embodiment. According to this example embodiment, the input module 320 retrieves contact lists 201 from many different members of the online social networking service 100.

In one example embodiment, the input module 320 retrieves hundreds of contact lists from computing devices used by the members. In another example embodiment, the input module 320 retrieves contact lists from a profile database 110. In another example embodiment, 50 or more of the contact lists 201 include the identifier 650-123-4567. In response to a count of the contacts exceeding a threshold number, the filter module 340 removes the contact from a list of associations. In this example, the threshold number of contacts is 40 and because more than 40 contact lists include the contact, the association is removed from the list by the filter module 340.

Figure 8:
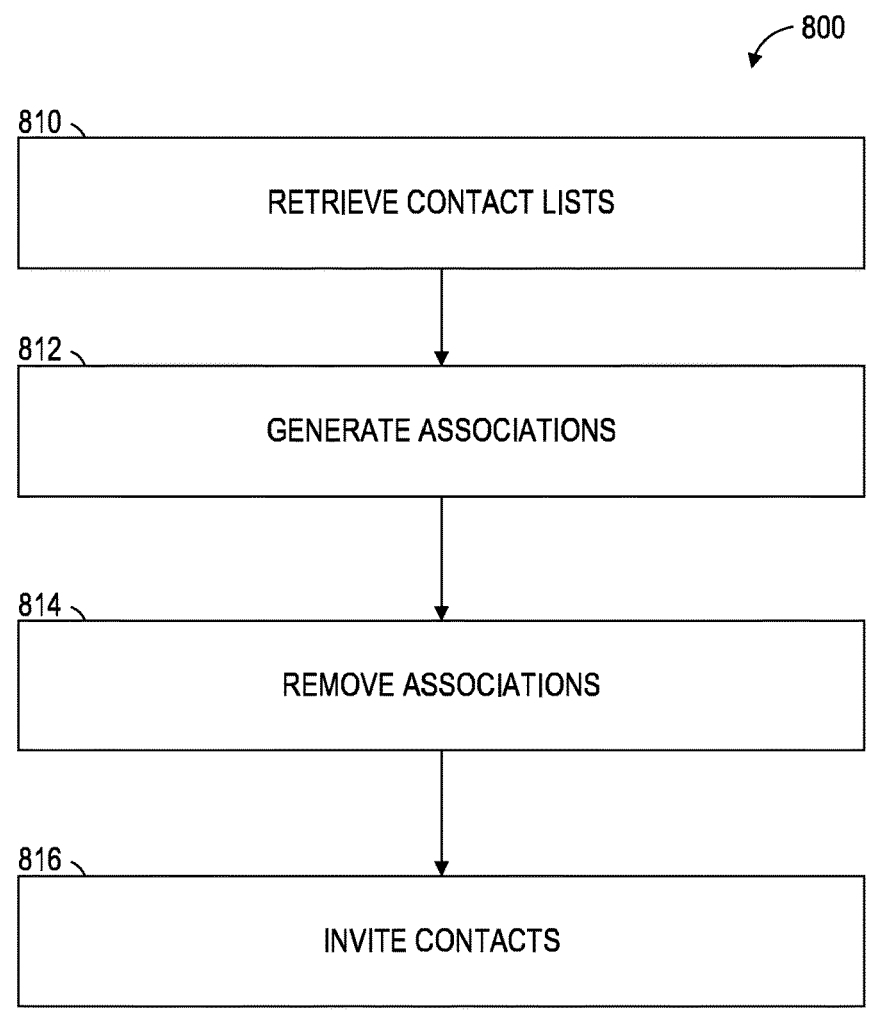
FIG. 8 is a flow chart diagram illustrating a method of expanding a social network, according to an example embodiment.

FIG. 8 is a flow chart diagram illustrating a method of expanding a social network, according to an example embodiment. According to one example embodiment, the method 800 is performed by one or more modules of the social network expansion system 150 and is described by a way of reference thereto.

In one example embodiment, the method 800 begins and at operation 810 the input module 320 retrieves one or more contact lists from computing devices used by members of the online social networking service 100. In one example, the input module 320 requests the contact list from a mobile device for a member.

The method 800 continues at operation 812 and the filter module 340 generates a list of associations between a first identifier for a first communication channel and a second identifier for a second communication channel. In one embodiment, the respective associations include a first identifier for a first communication channel and a second identifier for a second communication channel. In one example, a contact record includes a name and an email address. In another example, the contact record includes an email address and a network handle. In another example, the contact record includes a network handle and a mobile telephone number.

The method 800 continues at operation 814 and the filter module 340 removes contacts from the list of associations based on a determination that the contacts do not represent contacts that are not non-members of the online social networking service 100. For example, in response to a contact telephone number being a land-line, the filter module 340 removes the contact from the list of associations. Removing a contact from a list of associations at least includes removing associations in the list that include an identifier for the contact. In another example embodiment, at operation 814, the filter module 340 removes a contact from the list of associations in response to the contact expressing a desire to not be connected with the online social networking service 100.

The method 800 continues at operation 816 and the invitation module 360 invites contacts that remain in the list of associations by transmitting an invitation the second identifier on the second communication channel. In one example, the second identifier is a mobile telephone number and the invitation module 360 transmits an invitation via SMS to the mobile telephone number.

In another example embodiment of the method 800, the operation 816 is executed in response to a signal from a user that provided the list of contacts. In one example, the user requests his/her contacts to be invited to join the online social networking service 100 and the invitation module 360 invites the contacts by transmitting an invitation to the second identifier for the contact. In another example, the user requests that his/her contacts not be invited and the filter module 340 removes the contacts from the user so that they are not invited to join the online social networking service 100.

Figure 9:
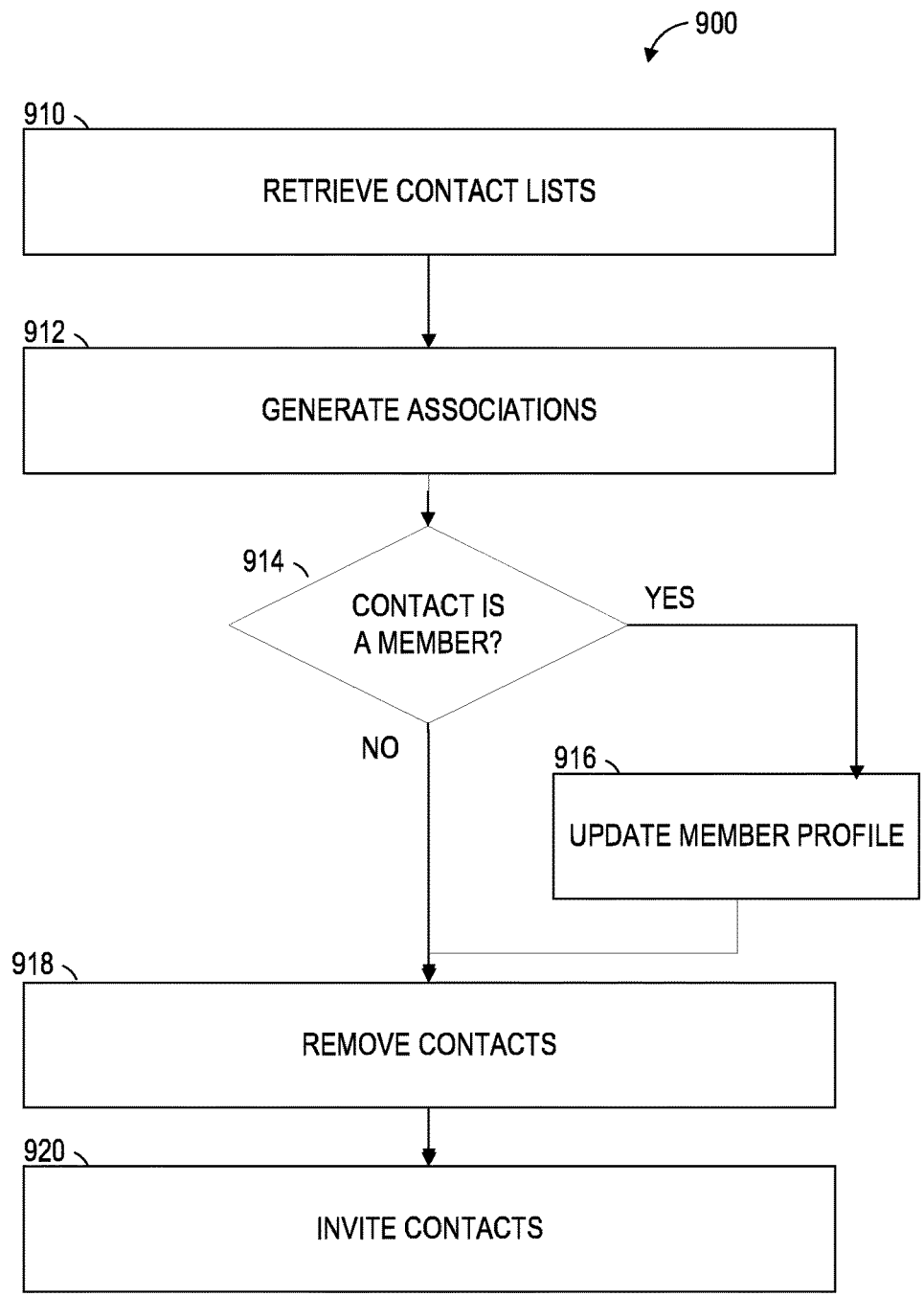
FIG. 9 is a flow chart diagram illustrating another method of expanding a social network, according to an example embodiment.

FIG. 9 is a flow chart diagram illustrating another method 900 of expanding a social network, according to an example embodiment. The method 900 is performed by one or more modules of the social network expansion system 150 and is described by a way of reference thereto.

In one example embodiment, the method 900 begins and at operation 910 the input module 320 retrieves one or more contact lists from devices associated with members of the online social networking service 100. In one example, the input module 320 receives a file that includes one or more contact records.

The method 900 continues at operation 912 and the filter module 340 generates a list of associations between identifiers at different communication mediums. In one example, two distinct contact records include a similar identifier and other identifiers. In response, the filter module 340 generates an association between the other identifiers. In one example embodiment, a first contact record includes a name and an email and a second contact records includes the email and a mobile telephone number. In response, the filter module 340 generates an association between the name and the telephone number. In another example embodiment, migrating a social graph from email to mobile telephone numbers, the filter module 340 generates associations between emails and mobile telephone numbers using the records in the contact lists.

The method 900 continues at operation 914 and the filter module 340 determines whether, for each contact in this list of associations, the contact is a member of the online social networking service 100. In one example, the filter module 340 compares the identifiers in the contact records with profile data in the database 110.

In response to the contact being a member of the online social networking service 100, the filter module 340, at operation 916, updates a profile for the member with a missing identifier. In one example, the contact record includes the member's email address, and a network handle for a remote network system. In response, the filter module 340 updates the profile data for the member with the network handle. The method 900 continues at operation 918.

In response to the contact not being a member of the online social networking service 100, the method continues at operation 918. At operation 918, the filter module 340 removes contacts from the list of associations based on a determination that the contacts are not non-members of the online social networking service 100. For example, in response to a contact telephone number including a predefined sequence of characters, the filter module 340 removes the contact from the list of associations. In another example embodiment, a contact has previously unsubscribed to messages from the online social networking service 100 and the filter module 340 removes the contact from the list of associations. This helps ensure that invite messages are transmitted to those contacts that will likely become members of the online social networking service 100.

The method 900 continues at operation 920 and the invitation module 360 invites contacts that remain in the list of associations by transmitting an invitation to the contact using the second identifier on the second communication channel. In one example, the second identifier is a network handle at a remote system and the invitation module 360 transmits a message to the handle. In one example embodiment, the filter module 340 creates an account at the remote network service in order to transmit the invitation.

Figure 10:
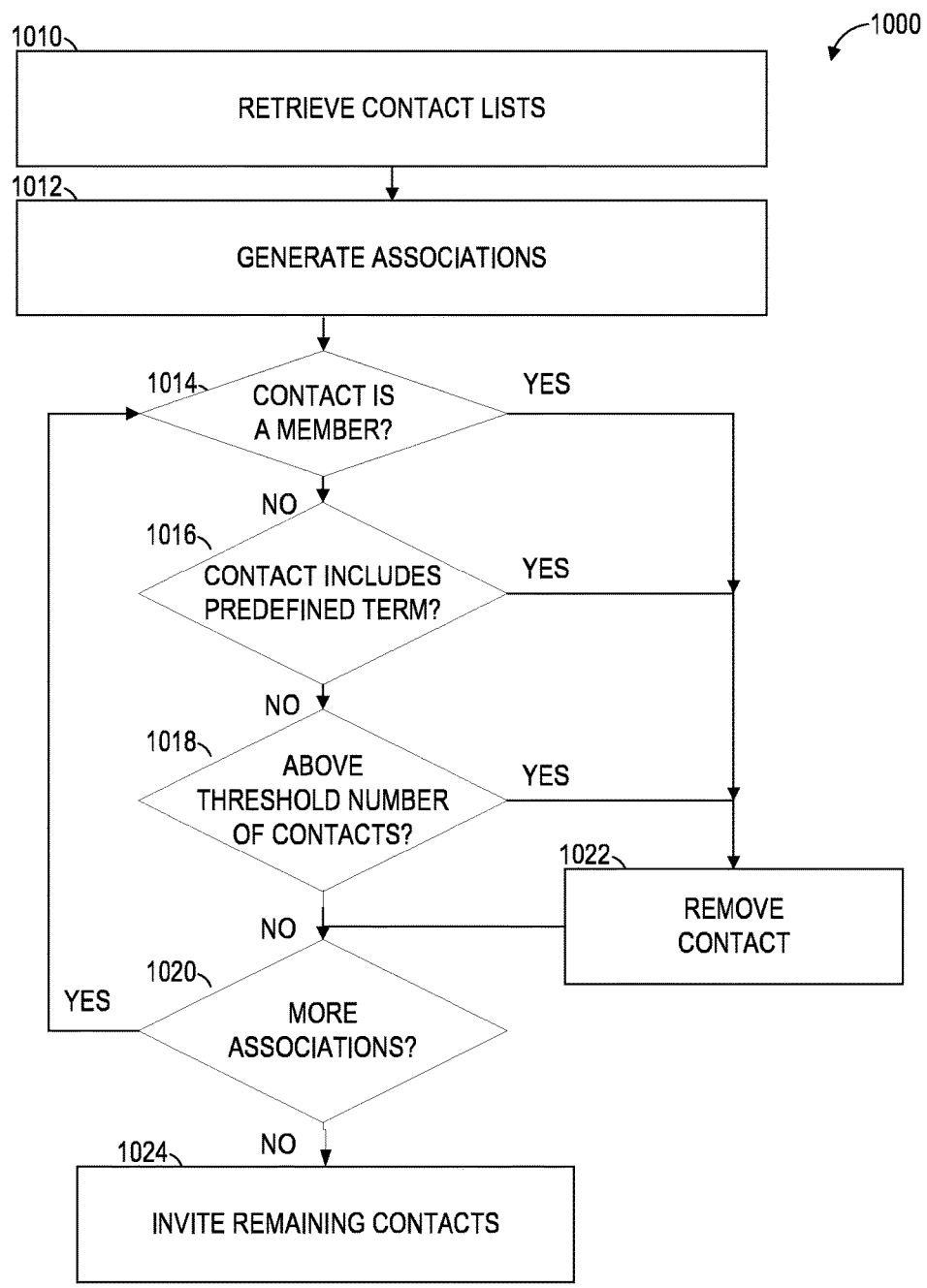
FIG. 10 is a flow chart diagram illustrating a method of expanding a social network, according to an example embodiment.

FIG. 10 is a flow chart diagram illustrating a method 1000 of expanding a social network, according to an example embodiment. The method 1000 is performed by one or more modules of the social network expansion system 150 and is described by a way of reference thereto. In one example embodiment, the method 1000 begins and at operation 1010 the input module 320 retrieves one or more contact lists from devices used by members of the online social networking service 100. In one example, the input module 320 downloads contacts from a remote server.

The method 1000 continues at operation 1012 and the filter module 340 generates a list of associations between a first identifier for a first communication channel and a second identifier for a second communication channel. In one example, a contact record includes an email address and a network handle.

The method 1000 continues at operation 1014. For each contact in the contact lists, the filter module 340 determines whether the contact is a member of the online social networking service 100. In response to the contact being a member of the online social networking service 100, the method 1000 continues at operation 1022. In response to the contact not being a member of the online social networking service 100, the method continues at operation 1016.

At operation 1016, the filter module 340 determines whether an identifier for the contact includes a predefined sequence of characters. In response to an identifier including a predefined sequence of characters, the method 1000 continues at operation 1022. In response to the identifier for the contact not including a predefined sequence of characters, the method continues at operation 1018.

At operation 1018, the filter module 340 determines whether a threshold of contact lists include a specific contact. In response to a contact being included in more than a threshold number of contact lists, the method 1000 continues at operation 1022. In response to the contact not being included in more than a threshold number of contact lists, the method 1000 continues at operation 1020.

At operation 1022, the filter module 340 removes the contact from the list of associations. The method 1000 continues at operation 1020. At operation 1020, the filter module 340 determines whether there are remaining contacts in the list of associations that have not yet been analyzed by the filter module 340. In response to more associations not having been analyzed by the filter module 340, the method 1000 continues at operation 1014 for another contact. In response to no remaining more associations remaining to be analyzed, the method 1000 continues at operation 1024.

At operation 1024, the invitation module 360 invites contacts that remain in the list of associations by transmitting an invitation to the second identifier on the second communication channel.

Figure 11:
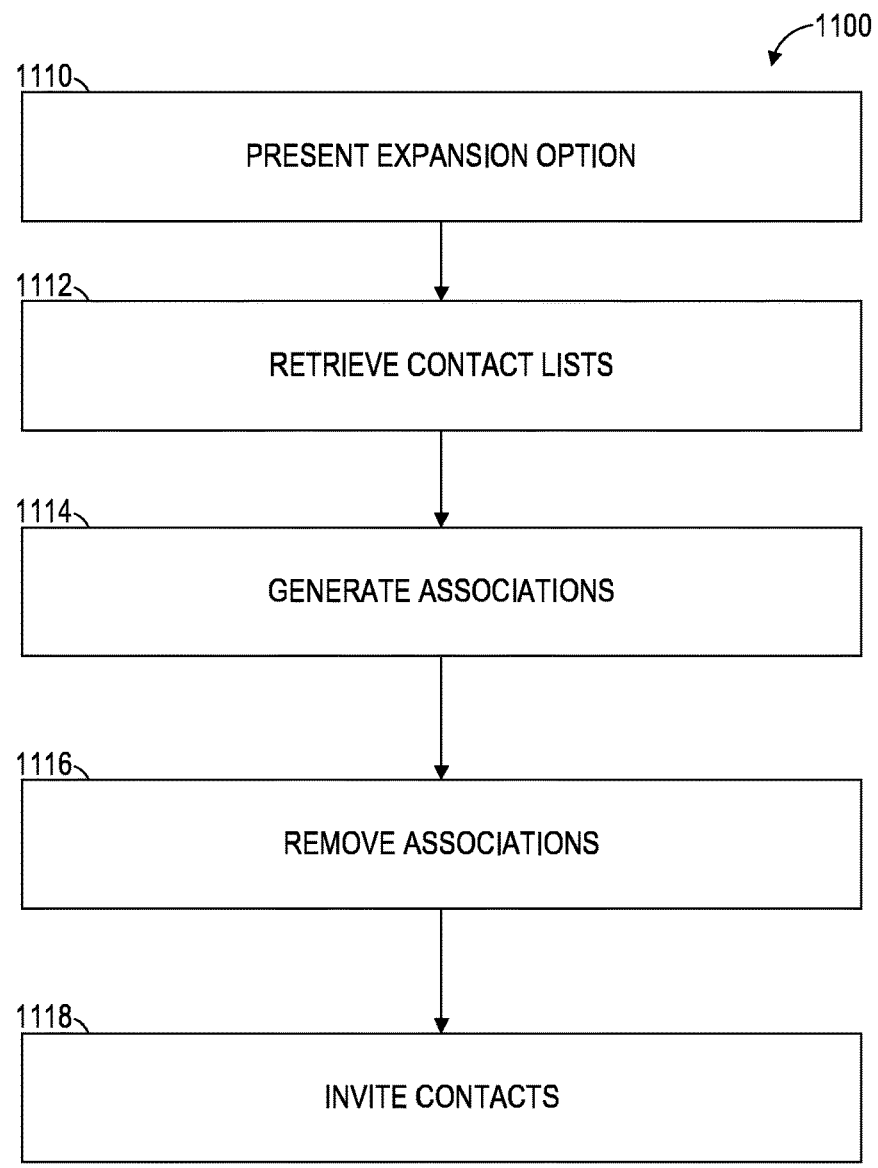
FIG. 11 is a flow chart diagram illustrating another method of expanding a social network, according to an example embodiment.

FIG. 11 is a flow chart diagram illustrating another method 1100 of expanding a social network, according to an example embodiment. The method 1100 is performed by one or more modules of the social network expansion system 150 and is described by a way of reference thereto.

In one example embodiment, the method begins and at operation 1110 the input module 320 presents an option, to a member of the online social networking service 100, to invite any and/or all of the member's contacts to the online social networking service 100. The option may include a selection using a graphical control, a button on a web page, or any other way one skilled in the art may recognize. In response to the member responding in the affirmative, the method 1100 continues at operation 1112.

At operation 1112, the input module 320 retrieves one or more contact lists from devices used by members of the online social networking service 100. The method 1100 continues at operation 1114 and the filter module 340 generates a list of associations based on the records in the contact lists. The method 1100 continues at operation 1116 and the filter module 340 removes associations from the list that do not include non-member contacts as described herein. The method 1100 continues at operation 1118 and the invitation module 360 invites contacts that remain in the list of associations as described herein by transmitting an invitation message to the second identifier on the second communication channel.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-11 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Example Machine Architecture and Machine-Readable Medium

Figure 12:
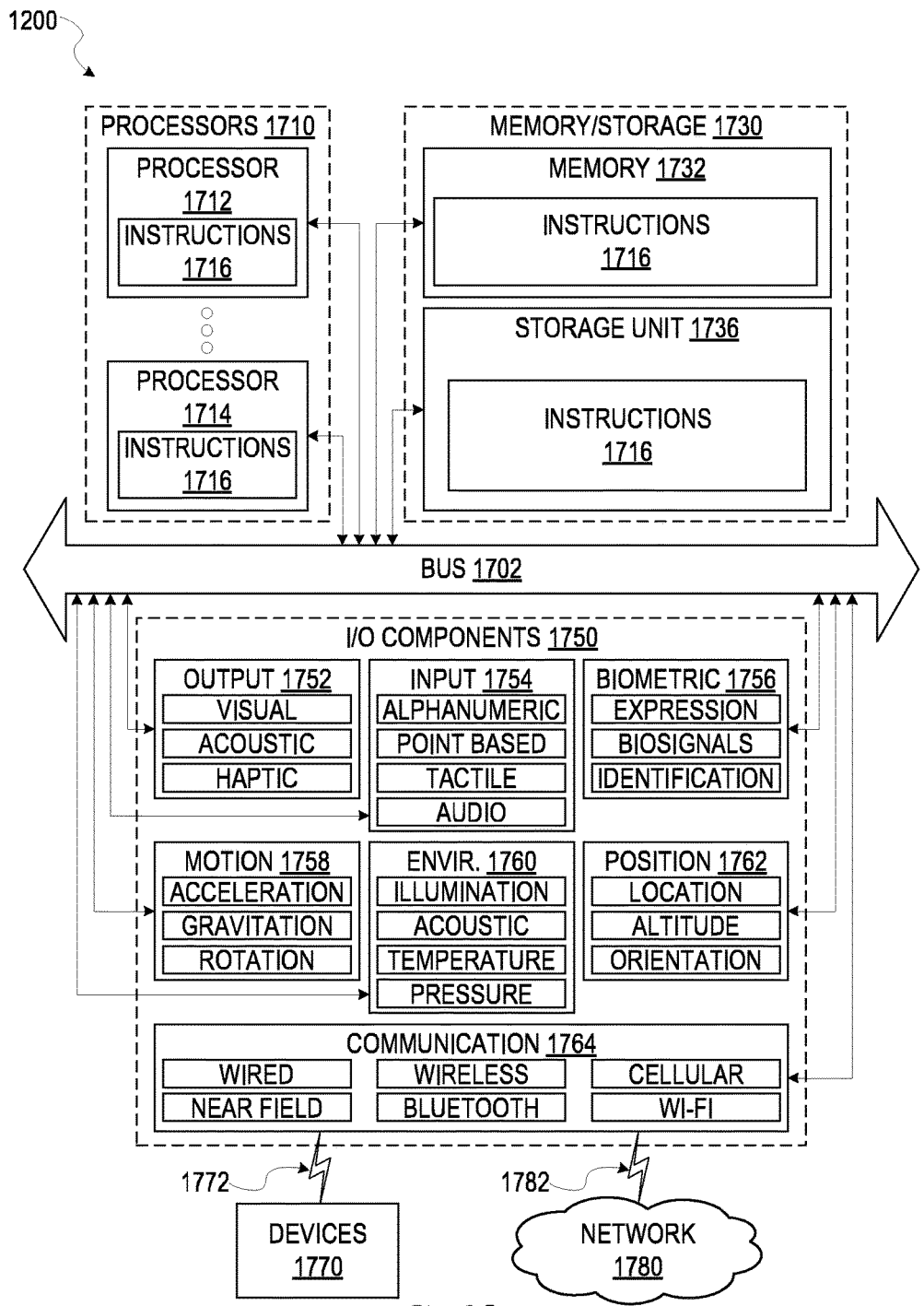
FIG. 12 is a block diagram illustrating components of a machine, according to some example embodiments, able to read instructions from a machine-readable medium (e.g., a machine-readable storage medium) and perform any one or more of the methodologies discussed herein

FIG. 12 is a block diagram illustrating components of a machine 1700, according to some example embodiments, able to read instructions from a machine-readable medium (e.g., a machine-readable storage medium) and perform any one or more of the methodologies discussed herein. Specifically, FIG. 12 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein may be executed. For example the instructions may cause the machine to execute the flow diagrams of FIGS. 8-11. Additionally, or alternatively, the instructions may implement one or more of the components of FIG. 3. The instructions transform the general, non-programmed machine into a particular machine programmed to carry out the described and illustrated functions in the manner described. In alternative embodiments, the machine 1700 operates as a stand-alone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a personal digital assistant (PDA), or any machine capable of executing the instructions 1716, sequentially or otherwise, that specify actions to be taken by machine 1700. Further, while only a single machine 1700 is illustrated, the term "machine" shall also be taken to include a collection of machines 1700 that individually or jointly execute the instructions 1716 to perform any one or more of the methodologies discussed herein.

The machine 1700 may include processors 1710, memory 1730, and I/O components 1750, which may be configured to communicate with each other such as via a bus 1702. In an example embodiment, the processors 1710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1712 and processor 1714 that may execute instructions 1716. The term "processor" is intended to include multi-core processor that may comprise two or more independent processors (sometimes referred to as "cores") that may execute instructions contemporaneously. Although FIG. 17 shows multiple processors, the machine 1700 may include a single processor with a single core, a single processor with multiple cores (e.g., a multi-core process), multiple processors with a single core, multiple processors with multiples cores, or any combination thereof.

The memory/storage 1730 may include a memory 1732, such as a main memory, or other memory storage, and a storage unit 1736, both accessible to the processors 1710 such as via the bus 1702. The storage unit 1736 and memory 1732 store the instructions 1716 embodying any one or more of the methodologies or functions described herein. The instructions 1716 may also reside, completely or partially, within the memory 1732, within the storage unit 1736, within at least one of the processors 1710 (e.g., within the processor's cache memory), or any suitable combination thereof, during execution thereof by the machine 1700. Accordingly, the memory 1732, the storage unit 1736, and the memory of processors 1710 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1716. The term "machine-readable medium" shall also be taken to include any medium, or combination of multiple media, that is capable of storing instructions (e.g., instructions 1716) for execution by a machine (e.g., machine 1700), such that the instructions, when executed by one or more processors of the machine 1700 (e.g., processors 1710), cause the machine 1700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1750 may include a wide variety of components to receive input, provide output, produce output, transmit information, exchange information, capture measurements, and so on. The specific I/O components 1750 that are included in a particular machine will depend on the type of machine. For example, portable machines such as mobile phones will likely include a touch input device or other such input mechanisms, while a headless server machine will likely not include such a touch input device. It will be appreciated that the I/O components 1750 may include many other components that are not shown in FIG. 17. The I/O components 1750 are grouped according to functionality merely for simplifying the following discussion and the grouping is in no way limiting. In various example embodiments, the I/O components 1750 may include output components 1752 and input components 1754. The output components 1752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1750 may include biometric components 1756, motion components 1758, environmental components 1760, or position components 1762 among a wide array of other components. For example, the biometric components 1756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1758 may include acceleration sensor components (e.g., accelerometer), gravitation sensor components, rotation sensor components (e.g., gyroscope), and so forth. The environmental components 1760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1750 may include communication components 1764 operable to couple the machine 1700 to a network 1780 or devices 1770 via coupling 1782 and coupling 1772 respectively. For example, the communication components 1764 may include a network interface component or other suitable device to interface with the network 1780. In further examples, communication components 1764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1770 may be another machine or any of a wide variety of peripheral devices (e.g., a peripheral device coupled via a Universal Serial Bus (USB)).

Moreover, the communication components 1764 may detect identifiers or include components operable to detect identifiers. For example, the communication components 1764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1764, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1780 or a portion of the network 1780 may include a wireless or cellular network and the coupling 1782 may be a Code Division Multiple Access (CDMA) connection, a Global System for Mobile communications (GSM) connection, or other type of cellular or wireless coupling. In this example, the coupling 1782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1716 may be transmitted or received over the network 1780 using a transmission medium via a network interface device (e.g., a network interface component included in the communication components 1764) and utilizing any one of a number of well-known transfer protocols (e.g., hypertext transfer protocol (HTTP)). Similarly, the instructions 1716 may be transmitted or received using a transmission medium via the coupling 1772 (e.g., a peer-to-peer coupling) to devices 1770. The term "transmission medium" shall be taken to include any intangible medium that is capable of storing, encoding, or carrying instructions 1716 for execution by the machine 1700, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
    a non-transitory machine-readable medium having instructions stored thereon, which, when executed by a processor, cause the system to:
        retrieve contact lists from a plurality of devices, each device associated with a member of an online social networking service;
        generate a list of associations between identifiers in a first communication channel and identifiers in a second communication channel by matching identifiers in the contact lists, respective associations including a first identifier for the first communication channel and a second identifier for the second communication channel;
        remove, from the list of associations, one or more associations that do not include identifiers representing contacts that are not members of the online social networking service; and
        transmit an invitation to join the online social networking service to the second identifiers on the second communication channel for associations that remain in the list of associations;
        wherein removing associations from the list of associations is in response to a determination that the respective associations represent members of the online social networking service;
        wherein the instructions further cause the system to update a profile for a member of the online social networking service represented by one of the associations in the list of associations by adding the second identifier in the association to the profile so that the system does not lose track of the member of the online social networking service because of a migration of the member from the first communication channel to the second communication channel; and
        wherein the instructions further cause the system to present an option to a member to invite contacts in a contact list for the member, the transmitting an invitation in response to an affirmative selection from the member.

2. The system of claim 1, wherein removing associations from the list of associations is in response to either the first identifier or the second identifier including a predetermined sequence of characters.

3. The system of claim 1, wherein removing associations from the list of associations is in response to a threshold number of contact lists including the second identifier.

4. The system of claim 1, wherein the first identifier is an email address and the second identifier is a telephone number.

5. A method comprising:
    retrieving, using one or more hardware processors, contact lists from a plurality of devices, each device associated with a member of an online social networking service;
    generating a list of associations between identifiers in a first communication channel and identifiers in a second communication channel by matching identifiers in the contact lists, respective associations including a first identifier for the first communication channel and a second identifier for the second communication channel;
    removing, from the list of associations, one or more associations that include identifiers that do not represent contacts that are not members of the online social networking service; and
    transmitting an invitation to join the online social networking service to the second identifiers on the second communication channel for associations that remain in the list of associations;
    wherein removing associations from the list of associations is in response to a determination that the respective associations represent members of the online social networking service;
    wherein the instructions further cause the system to update a profile for a member of the online social networking service represented by one of the associations in the list of associations by adding the second identifier in the association to the profile so that the system does not lose track of the member of the online social networking service because of a migration of the member from the first communication channel to the second communication channel; and
    wherein the instructions further cause the system to present an option to a member to invite contacts in a contact list for the member, the transmitting an invitation in response to an affirmative selection from the member.

6. The method of claim 5, wherein removing associations from the list of associations is in response to either the first identifier or the second identifier including a predetermined sequence of characters.

7. The method of claim 5, wherein removing associations from the list of associations is in response to a threshold number of contact lists including the second identifier.

8. The method of claim 5, wherein the first identifier is an email address and the second identifier is a telephone number.

9. A non-transitory machine-readable medium having instructions stored thereon, which, when executed by a processor, cause the processor to perform:
    retrieving contact lists from a plurality of devices, each device associated with a member of an online social networking service;
    generating a list of associations between identifiers in a first communication channel and identifiers in a second communication channel by matching identifiers in the contact lists, respective associations including a first identifier for the first communication channel and a second identifier for the second communication channel;

removing, from the list of associations, one or more associations that do not include identifiers that represent contacts that are not members of the online social networking service; and transmitting an invitation to join the online social networking service to the second identifiers on the second communication channel for associations that remain in the list of associations;

wherein removing associations from the list of associations is in response to a determination that the respective associations represent members of the online social networking service;

wherein the instructions further cause the system to update a profile for a member of the online social networking service represented by one of the associations in the list of associations by adding the second identifier in the association to the profile so that the system does not lose track of the member of the online social networking service because of a migration of the member from the first communication channel to the second communication channel; and wherein the instructions further cause the system to present an option to a member to invite contacts in a contact list for the member, the transmitting an invitation in response to an affirmative selection from the member.

10. The non-transitory machine-readable medium of claim 9, wherein removing associations from the list of associations is in response to either the first identifier or the second identifier including a predetermined sequence of characters.

11. The non-transitory machine-readable medium of claim 9, wherein removing associations from the list of associations is in response to a threshold number of contact lists including the second identifier.

12. The non-transitory machine-readable medium of claim 9, wherein the transmitting an invitation is in response to receiving a command from a user that provided one of the contact lists.

* * * * *